US012189190B1

(12) United States Patent
Van Vickle (10) Patent No.: US 12,189,190 B1
(45) Date of Patent: Jan. 7, 2025

(54) CONNECTOR FOR OPTICAL FIBERS

(71) Applicant: Amazon Technologies, Inc., Seattle, WA (US)

(72) Inventor: Patrick Stephen Van Vickle, Apex, NC (US)

(73) Assignee: Amazon Technologies, Inc., Seattle, WA (US)

( * ) Notice: Subject to any disclaimer, the term of this patent is extended or adjusted under 35 U.S.C. 154(b) by 276 days.

(21) Appl. No.: 17/687,474

(22) Filed: Mar. 4, 2022

(51) Int. Cl.
*G02B 6/38* (2006.01)
*G02B 6/032* (2006.01)

(52) U.S. Cl.
CPC ........... *G02B 6/3853* (2013.01); *G02B 6/032* (2013.01); *G02B 6/3831* (2013.01); *G02B 6/38875* (2021.05)

(58) Field of Classification Search
None
See application file for complete search history.

(56) References Cited

U.S. PATENT DOCUMENTS

| 2017/0168244 A1* | 6/2017 | Rubino | G02B 6/3803 |
| 2021/0145260 A1* | 5/2021 | Boelen | A61B 1/00126 |
| 2023/0244040 A1* | 8/2023 | Smaglinski | G02B 6/3853 |
| | | | 385/61 |

FOREIGN PATENT DOCUMENTS

DE  4209926 A1 *  9/1993  ............. A61B 18/22

OTHER PUBLICATIONS

Translation of DE4200026A1 (Year: 1993).*

* cited by examiner

*Primary Examiner* — Chad H Smith
(74) *Attorney, Agent, or Firm* — Kilpatrick Townsend & Stockton LLP (57) ABSTRACT

A fiber optic connector can include a connector body with a connector channel extending therethrough. A ferrule can be positioned in a first end of the connector channel and a hollow core fiber can be positioned in a second end of the connector channel. A lens can be positioned in the connector channel between the ferrule and the hollow core fiber. The lens can direct light emitted from the hollow core fiber to an optical fiber within the ferrule.

17 Claims, 5 Drawing Sheets

CONNECTOR FOR OPTICAL FIBERS

BACKGROUND

Datacenters house collections of servers and networking hardware, including switches and routers. Often cables, for example fiber optic cables and/or fiber optic ribbons, are used to connect the components. The cables can be installed by splicing the cables together. However, splicing the cables together can be an expensive and time-consuming process that uses specialized tools and equipment. For example, splicing some types of fiber optic cables can only be done by specially trained technicians with specialized tools.

BRIEF DESCRIPTION OF THE DRAWINGS

Various embodiments in accordance with the present disclosure will be described with reference to the drawings, in which.

DETAILED DESCRIPTION

Among other things, examples herein are directed to systems and techniques relating to a connector for fiber optic cables. The techniques described herein may be implemented by any suitable connector, but particular examples are directed to a connector that can be used to connect a hollow core fiber with a traditional receiver for use with a traditional fiber optic connector (e.g., couplers and/or transceivers that receive fiber optic strands). The connector can receive a hollow core fiber in one end and a ferrule containing a fiber optic strand (e.g., a single-mode optical fiber) in the other end. A lens can be positioned in the connector to direct a signal (e.g., light) emitted from the hollow core fiber to the fiber optic strand in the ferrule. The connector can be positioned in the traditional fiber optic receiver to transmit the signal (e.g., light) from the hollow core fiber to the traditional receiver.

Turning now to a particular example, a connector can include a connector body and a channel extending through the connector body. A ferrule can be positioned in a first end of the channel. The ferrule can include a fiber optic strand (e.g., a single-mode optical fiber) that can be used to transmit a signal to outside the connector. For example, the ferrule can interface with traditional receivers for use with a traditional fiber optic connector (e.g., couplers and/or transceivers). The fiber optic strand can transmit a signal from the connector to the fiber optic receivers (e.g., when the connector is positioned in the receiver). A hollow core fiber can be positioned in a second end of the channel. The hollow core fiber can transmit a signal (e.g., light) to the connector. The end of the hollow core fiber can be aligned with a lens positioned in the channel (e.g., between the ferrule and the hollow core fiber). The lens can direct the signal (e.g., the light) from the end of the hollow core fiber to the ferrule. The connector can be positioned in the receiver to transmit the signal (e.g., the light) from the hollow core fiber to the receiver.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
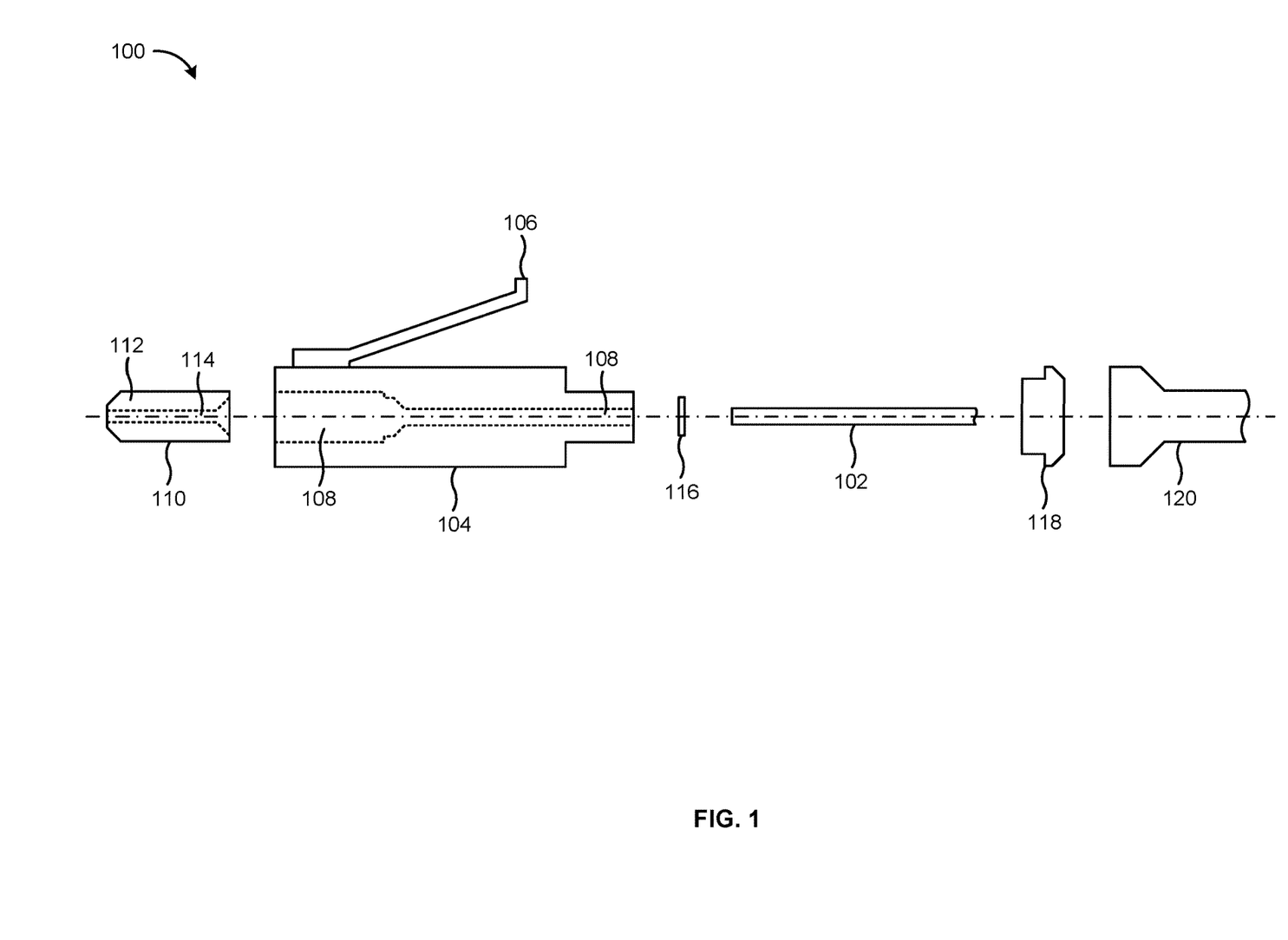
FIG. 1 shows an exploded view of an example fiber optic connector for use with a hollow core fiber optic cable, according to various embodiments.
Figure 2:
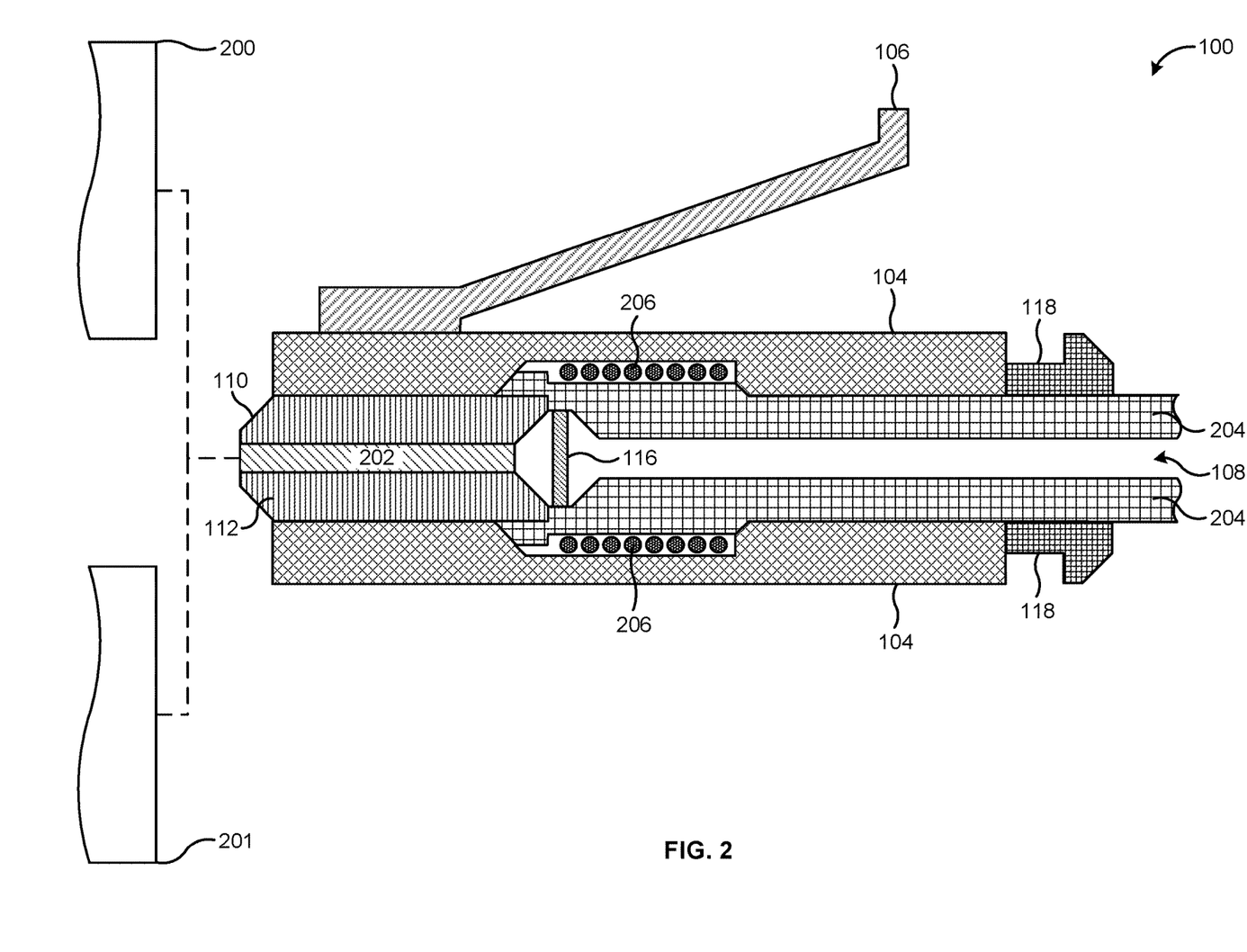
FIG. 2 shows a cross-section of the example fiber optic connector of FIG. 1, according to various embodiments.

Turning now to the figures, FIG. 1 shows an exploded view of an example fiber optic connector 100 for use with a hollow core fiber optic cable 102 (hereinafter referred to as "hollow core fiber 102"). The fiber optic connector 100 can be used to connect the hollow core fiber 102 with a receiver (e.g., transceiver 200 or coupler 201 as shown in FIG. 2). When the fiber optic connector 100 is connected with the transceiver 200 or coupler 201, a signal can be transmitted from the hollow core fiber 102 through the fiber optic connector 100 to the transceiver 200 or coupler 201. The signal can be or include light that has traveled along and/or within the hollow core fiber 102. In various embodiments, the signal can be or include data. The fiber optic connector 100 can be used to connect the hollow core fiber 102 with a transceiver 200 or coupler 201 (e.g., a transceiver 200 or coupler 201 that receives a connector containing one or more fiber optic strands). For example, the fiber optic connector 100 can allow the hollow core fiber 102 to be used with a transceiver 200 or coupler 201 that receives single-mode fiber optic cable without modifying the transceiver 200 or coupler 201 and/or the hollow core fiber 102.

Traditionally, hollow core fiber 102 can be connected with traditional fiber optic receivers and/or traditional fiber optic strands using a complicated and precise splicing process. For example, the process of splicing the hollow core fiber 102 can include the use of precision equipment and specialized knowledge and techniques.

The fiber optic connector 100 can allow for the connection of the hollow core fiber 102 with the transceiver 200 or coupler 201 without using the traditional expensive and complicated splicing techniques. For example, the hollow core fiber 102 can be positioned in the connector body 104. The fiber optic connector 100 can then allow for the connection of the hollow core fiber 102 to standard fiber. For example, the fiber optic connector 100 be positioned in a transceiver 200 and/or a coupler 201. In some embodiments, the connector body 104 can be retained in the transceiver 200 or coupler 201 and/or the coupler 201 using a retention latch 106.

The fiber optic connector 100 can allow for a signal to be sent from the hollow core fiber 102 to a standard fiber. In various embodiments, a signal from the hollow core fiber 102 can be conveyed through the fiber optic connector 100 to the transceiver 200 to facilitate signal transmission into a server and/or other appliance that may be connected with the transceiver 200. In further embodiments, a signal from the hollow core fiber 102 may be conveyed through the fiber optic connector 100 to and/or through a coupler 201 to facilitate transmission through additional cabling extending from the coupler 201. The coupler and/or the fiber optic connector 100 can correspond to structure that functions as an adapter between two components and/or interfaces for establishing a path for signal transmission, for example.

The hollow core fiber 102 can be positioned in one end of a channel 108 that extends through the connector body 104. A ferrule 110 can be positioned in the other end (e.g., an opposing end) of the channel 108. The ferrule 110 can include a ferrule body 112 and a passage 114 extending through the ferrule body 112. As shown in FIG. 2, a fiber optic strand 202 can be positioned in the passage 114 such that the ferrule body 112 leaves the ends of the fiber optic strand 202 uncovered (e.g., to allow a signal and/or light to enter one end of the fiber optic strand 202 and exit another end of the fiber optic strand 202). The fiber optic strand 202 can be fixed in position in the passage 114 using adhesives and/or a fixation device. For example, the fiber optic strand 202 can be positioned in the passage 114 using epoxy. In further embodiments, one or both ends of the fiber optic strand 202 can be processed. For example, one or both ends of the fiber optic strand 202 can be polished (e.g., polished flush with the end of the channel 108).

When the connector body 104 is positioned in the transceiver 200 and/or the coupler 201, the fiber optic strand 202 can transmit a signal (e.g., light) from the hollow core fiber 102 to the transceiver 200 and/or the coupler 201. For example, the signal can be emitted from the end of the hollow core fiber 102, received at a first end (e.g., a proximal end) of the fiber optic strand 202, and transmitted through the fiber optic strand 202 to a second end (e.g., a distal end). The signal can continue from the second or distal end of the fiber optic strand 202 into a suitable structure in the transceiver 200 and/or the coupler 201 for further processing and/or conveying the signal in use.

A lens 116 can be positioned in the connector body 104. The lens 116 can be positioned in the connector body 104 between the hollow core fiber 102 and the ferrule 110. For example, the lens 116 can be positioned in the connector body 104 such that when the hollow core fiber 102 and the ferrule 110 are positioned in the channel 108, the lens 116 is positioned between the end (e.g., a proximal or leading end) of the ferrule 110 and the end of the hollow core fiber 102. The lens 116 can direct the signal (e.g., the light) from the end of the hollow core fiber 102 to the proximal or leading end of the ferrule 110 (e.g., to the end of the fiber optic strand 202 in the ferrule 110). The signal (e.g., the light) can travel from the proximal or leading end of the fiber optic strand 202 to a distal end of the fiber optic strand 202.

The end of the hollow core fiber 102 and the end of the ferrule 110 can be positioned any suitable distance from the lens 116. For example, the hollow core fiber 102 can be positioned a distance away from the lens 116 for optimal beam capture by the lens 116. In various embodiments, the end of the hollow core fiber 102 and the end of the ferrule 110 can be positioned in a range where the end of the hollow core fiber 102 and the end of the ferrule 110 are positioned between 0 microns away from the lens 116 and 20 microns away from the lens 116, although other ranges and/or values may be utilized.

In various embodiments, the fiber optic connector 100 can include an adjustment device 118. The adjustment device 118 can move the hollow core fiber 102 when the hollow core fiber 102 has been positioned in the channel 108. The adjustment device 118 can move the hollow core fiber 102 (e.g., the end of the hollow core fiber 102) relative to the lens 116. For example, the adjustment device 118 can move the end of the hollow core fiber 102 along a horizontal axis (e.g., axis 602 in FIG. 6) relative to the lens 116. The adjustment device 118 can move the hollow core fiber 102 in any suitable increments, however, in various embodiments, the adjustment device 118 can move the hollow core fiber 102 in micron increments. The adjustment device 118 can additionally or alternatively be used to adjust the position of the hollow core fiber 102 in the channel 108 along a vertical axis (e.g., axis 606 in FIG. 6). In various embodiments, the adjustment device 118 can similarly move along the horizontal axis (e.g., axis 602) and/or the vertical axis (e.g., axis 606).

In some embodiments, the adjustment device 118 can move the hollow core fiber 102 and the lens 116. For example, the hollow core fiber 102 can be positioned a fixed distance from the lens 116. The adjustment device 118 can move the hollow core fiber 102 and the lens 116 (e.g., such that the distance between the hollow core fiber 102 and the lens 116 remains constant). For example, the adjustment device 118 can move the hollow core fiber 102 and the lens 116 such that the distance between the end (e.g., the proximal end) of the fiber optic strand 202 of the ferrule 110 and the lens 116 changes while the distance between the end of the hollow core fiber 102 and the lens 116 stays constant.

In further embodiments, the fiber optic connector 100 can include a boot 120. The boot 120 can provide strain relief for the hollow core fiber 102 (e.g., the portion of the hollow core fiber 102 extending from the connector body 104). The boot 120 can reduce damage to the hollow core fiber 102 that can be caused by bending of the hollow core fiber 102. The boot 120 can be positioned over a portion of the hollow core fiber 102, the adjustment device 118, and/or the connector body 104. The boot 120 can be or include plastic, ceramic, metal, carbon-fiber, and/or any suitable rigid or semi-rigid material that can provide strain relief to the hollow core fiber 102.

Turning to FIG. 2, a cross-section of the fiber optic connector 100 of FIG. 1 is shown. The fiber optic connector 100 can be engaged with a transceiver 200 or a coupler 201, for example, to transmit a signal from the hollow core fiber 102 to the transceiver 200 or the coupler 201. The transceiver and/or coupler 201 can include appropriate structure establishing sufficient connection between the hollow core fiber 102 and electronic equipment for transferring data, power, etc.

The transceiver 200 can be or include a small form-factor (SFP) transceiver, such as is commonly used for telecommunication and/or data communications applications. The transceiver 200 can additionally or alternatively correspond to enhanced small form-factor (SFP+) transceiver and/or a compact small form-factor pluggable (CSFP) transceiver. The coupler 201 can allow for connection of the hollow core fiber 102 to a standard fiber (e.g., a standard glass fiber). The coupler 201 can be or include an adaptor or other structure for coupling two components together for establishing a path for the signal transmission. For example, the coupler 201 can include structure similar to a traditional connector (e.g., a fiber-to-fiber connector) and/or an LC connector. The coupler 201 can function as at least a part of a cable-to-cable adapter, for example.

In various embodiments, the fiber optic connector 100 can additionally or alternatively include appropriate structure for establishing sufficient connection between the hollow core fiber 102 and electronic equipment. For example, the fiber optic connector 100 can include appropriate structure for transferring data, power, etc. between the hollow core fiber 102 and the electronic equipment.

Figure 3:
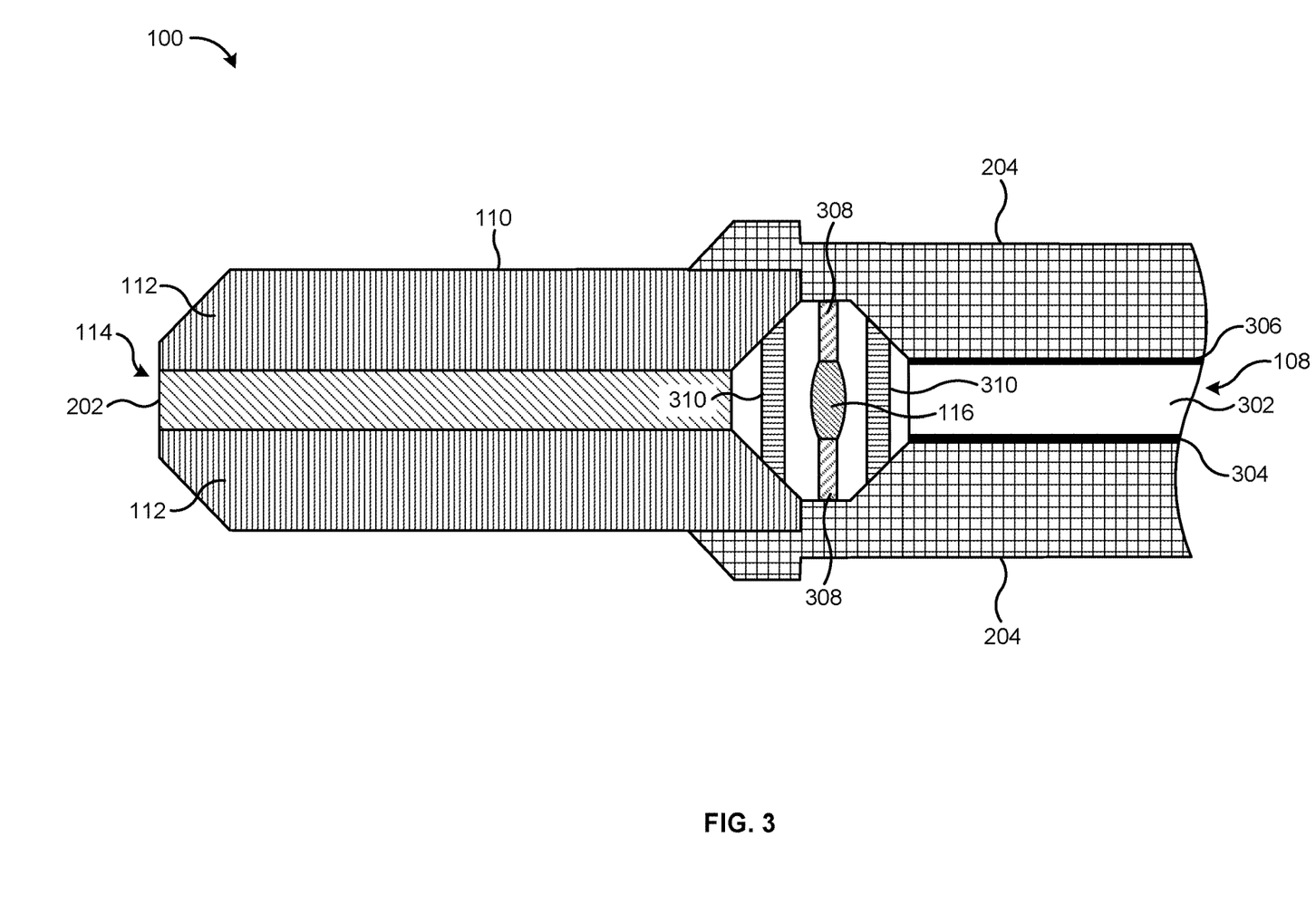
FIG. 3 shows a detailed view of a portion of the fiber optic connector of FIG. 2, according to various embodiments.

The fiber optic connector 100 can include a ferrule 110 positioned in one end of a channel 108 that extends through the connector body 104. The other end of the channel 108 can receive the hollow core fiber 102 (e.g., as shown in FIG. 3). The channel 108 can be formed by the connector body 104 and/or a receiving collar 204. For example, a first portion of the channel 108 can be formed by the connector body 104 and a second part of the channel 108 can be formed by the receiving collar 204. In some embodiments, the connector body 104 and the receiving collar 204 can be monolithic (e.g., the same piece). However, the connector body 104 and the receiving collar 204 may be different pieces. For example, the receiving collar 204 may be removable from the connector body 104.

The connector body 104 and/or the receiving collar 204 can be or include rigid or semi-rigid material. For example, the connector body 104 and/or the receiving collar 204 can include material that can withstand insertion of the connector body 104 in the transceiver 200 or coupler 201, removal of the connector body 104 from the transceiver 200 or coupler 201, and/or insertion and removal of the hollow core fiber 102. The connector body 104 and/or the receiving collar 204 can be or include ceramic, metal, glass, plastic, carbon fiber strands, polymers, and/or any suitable material.

The hollow core fiber 102 can be positioned in one end (e.g., a first end) of the channel 108. For example, the hollow core fiber 102 can be positioned in the end of the channel 108 formed by the receiving collar 204. The portion of the channel 108 that can receive the hollow core fiber 102 can be sized and shaped such that the diameter of the channel 108 is the same as or similar to the diameter of the hollow core fiber 102. For example, insertion of the hollow core fiber 102 into the channel 108 can limit or prevent movement (e.g., movement in the vertical direction) of the portion of the hollow core fiber 102 inserted in the channel 108.

In various embodiments, the connector body 104 can include a retention latch 106. The retention latch can be deformed or deflected for insertion of the connector body 104 into the transceiver 200 or coupler 201 and/or removal of the connector body 104 from the transceiver 200 or coupler 201. For example, the retention latch 106 can be temporarily deformed or deflected during insertion of the connector body 104 into the transceiver 200 or coupler 201 and return to the original position or close to the original position to retain the connector body 104 in the transceiver 200 or coupler 201. The retention latch 106 can be deformed or deflected, and the connector body 104 can be removed from the transceiver 200 or coupler 201. The retention latch 106 can be or include metal, plastic, polymers, carbon fiber, and/or any suitable rigid or semi-rigid material.

The ferrule 110 can be positioned in the other end (e.g., a second end) of the channel 108. The portion of the channel 108 that can receive the ferrule 110 can have the same or a similar diameter as the portion of the channel 108 that can receive the hollow core fiber 102. However, the portion of the channel 108 that can receive the ferrule 110 can be a different size and/or shape. For example, the portion of the channel 108 that can receive the ferrule 110 can have a larger diameter than the portion of the channel 108 that can receive the hollow core fiber 102.

In various embodiments, the ferrule 110 can include a ferrule body 112 surrounding a fiber optic strand 202 (e.g., a single-mode optical fiber). The ferrule body 112 can be a rigid or semi-rigid body. One end of the ferrule body 112 can be sized and shaped to be inserted into a transceiver 200 or coupler 201. For example, one end of the ferrule body 112 can be shaped to deform or deflect when inserted into the transceiver 200 or coupler 201. A second end of the ferrule body 112 can be sized and shaped to engage with an end of the hollow core fiber 102. For example, the second end of the ferrule body 112 can be angled to engage with the end of the hollow core fiber 102. The ferrule body 112 can be or include ceramic, metal, plastic, glass, carbon-fiber, polymer, and/or any suitable material.

In some embodiments, one end of the ferrule 110 can be shaped to engage with the receiving collar 204 and/or the hollow core fiber 102. The end of the ferrule 110 can be angled to form a better connection with the receiving collar 204 and/or the hollow core fiber 102. For example, the one end of the ferrule 110 can be angled from the fiber optic strand 202 to a face for engagement with the receiving collar 204 and/or the hollow core fiber 102.

The fiber optic strand 202 can extend from one end of the ferrule body 112 to the other end of the ferrule body 112. The fiber optic strand 202 can transmit a signal (e.g., through the ferrule body 112) to a receiving device (e.g., a transceiver and/or any suitable electronic device) when the connector body 104 is engaged with the transceiver 200 or coupler 201. The fiber optic strand 202 can be or include a fiber, a single-mode fiber, a multi-mode fiber, a glass fiber, multiple fiber optic strands, and/or any suitable strand for transmitting a signal (e.g., light).

In various embodiments, a spring 206 can be positioned in the connector body 104. The spring 206 can be used to maintain a connection between the ferrule 110 (e.g., the fiber optic strand 202) and the transceiver 200 or coupler 201. For example, the spring 206 can resist movement of the ferrule 110 into the connector body 104 in response to the ferrule 110 engaging a portion of the transceiver 200 or coupler 201. The spring 206 can additionally or alternatively resist movement of the receiving collar 204. For example, the spring 206 can resist movement of the receiving collar 204 caused by movement of the ferrule 110 and/or by the adjustment device 118 moving the receiving collar 204.

The adjustment device 118 can be used to make microadjustments to the position of the hollow core fiber 102. For example, the adjustment device 118 can move the hollow core fiber 102 along the horizontal axis using micron increments. However, the adjustment device 118 can position (e.g., via movement or changing the position of) the hollow core fiber using smaller or larger increments. The adjustment device 118 can be or include a gear, threads, latches, clasps, magnets, adhesives, and/or any suitable device for engaging with and positioning the hollow core fiber 102. In various embodiments, the adjustment device 118 can rotate (e.g., as shown by rotation arrow 604 in FIG. 6) to position the hollow core fiber 102. However, the adjustment device 118 can be pushed, pulled, and/or otherwise moved to position the hollow core fiber 102.

In some embodiments, the adjustment device 118 can be used with standard installation equipment. For example, installation equipment that is commonly used, readily available, and/or inexpensive. The use of standard installation equipment can allow a technician to install the fiber optic connector 100 without needing specialized training or expensive, specialized equipment.

In further embodiments, the standard installation equipment can be or include a power meter that can be used to position (e.g., precisely position) the end of the hollow core fiber 102 relative to the lens 116. For example, a power meter can be used to measure the signal exiting the fiber optic connector 100 (e.g., a signal from the hollow core fiber 102 and exiting from the ferrule 110) as the end of the hollow core fiber 102 is moved relative to the lens 116.

In various embodiments, the adjustment device 118 can move the hollow core fiber 102 within the channel 108 formed by the receiving collar 204. For example, the adjustment device 118 can move the hollow core fiber 102 relative to the walls of the receiving collar 204. However, the adjustment device 118 may additionally or alternatively move a portion of the receiving collar 204 relative to the connector body 104. For example, the adjustment device 118 can move the receiving collar 204 containing the hollow core fiber 102 such that the end of the hollow core fiber 102 is moving relative to the lens 116 when the receiving collar 204 is moved. In various embodiments, the adjustment device 118 can include a worm gear that can be used to move the hollow core fiber 102. For example, the adjustment device 118 can include threads that engage with teeth on the receiving collar 204, the connector body 104, and/or the hollow core fiber 102. Rotating the adjustment device 118 can engage the threads with the teeth to change the position of the hollow core fiber 102 (e.g., by moving the hollow core fiber 102 into or out of the channel 108).

The adjustment device 118 can lock the hollow core fiber 102 in position. For example, the adjustment device 118 can lock the hollow core fiber 102 in position in the channel 108 after the adjustment device 118 has adjusted the position of the hollow core fiber 102. However, the adjustment device 118 can lock the hollow core fiber 102 in position without being used to adjust the position of the hollow core fiber 102 in the channel 108.

In various embodiments, some or all of the adjustment device 118 can be removed (e.g., detached) from the connector body 104. For example, after adjusting the position of the hollow core fiber 102 and/or locking the position of the hollow core fiber 102, some or all of the adjustment device 118 can be removed (e.g., the portion of the adjustment device 118 that locks the hollow core fiber 102 in position can remain connected to the connector body 104 and the rest of the adjustment device 118 can be removed). However, all of the adjustment device 118 can be removed or all of the adjustment device 118 can remain attached to the connector body 104.

In further embodiments, the boot 120 can be positioned over the portion of the adjustment device 118 that remains attached to the connector body 104 (e.g., after adjusting the position of the hollow core fiber 102 and/or locking the hollow core fiber 102 in position). However, the boot 120 can be positioned over the connector body 104 and/or the hollow core fiber 102 after the adjustment device has been removed.

Turning to FIG. 3, a detailed view of a portion of the fiber optic connector 100 of FIG. 2 is shown. The hollow core fiber 102 can be positioned in the channel 108 (e.g., in the receiving collar 204). The hollow core fiber 102 can guide a signal (e.g., light) within a hollow region 302. The hollow core fiber 102 can include a hollow region 302 surrounded by a microstructure cladding 304. The microstructure cladding 304 can be surrounded by a coating 306 (e.g., an acrylate coating). The hollow region 302 of the hollow core fiber 102 can be filled with air, however, the hollow region 302 may additionally or alternatively be filled with an inert gas.

The hollow core fiber 102 can be positioned in the channel 108 such that the hollow region 302 is aligned with the fiber optic strand 202. The hollow region 302 can be aligned with the fiber optic strand 202 to transmit the signal (e.g., light) from the hollow core fiber 102 to the fiber optic strand 202.

In various embodiments, the hollow core fiber 102 can be locked in position in the channel 108. The hollow core fiber 102 can be locked in position such that the end of the hollow core fiber 102 remains in a consistent position relative to the lens 116. The adjustment device 118 can be used to lock the position of the hollow core fiber 102 in the channel 108. Additionally or alternatively, a separate locking mechanism can be used to lock the position of the hollow core fiber 102 in the channel 108. For example, a locking nut and/or a similar locking feature can lock the position of the hollow core fiber 102 in the channel 108.

The lens 116 can be positioned between the hollow core fiber 102 and the ferrule 110. The lens 116 can direct the signal (e.g., the light) from the hollow core fiber 102 to the fiber optic strand 202. For example, the signal can spread after leaving the end of the hollow core fiber 102 and the lens 116 can focus the signal and/or direct the signal to the end (e.g., the proximal or leading end) of the fiber optic strand 202. The lens 116 can be or include any suitable material, however, in various embodiments, the lens 116 can be or include glass and/or plastic.

In various embodiments, the lens 116 can have a convex shape that can aid in the directing of the signal. For example, the center of the convex lens can be aligned with the center of the fiber optic strand 202 to aid in directing the signal from the end of the hollow core fiber 102 to the fiber optic strand 202.

The lens 116 can have the same or a similar diameter as the diameter of the channel 108 and/or the diameter of the hollow core fiber 102. For example, the lens 116 can be mounted against the walls of the connector body 104 and/or the receiving collar 204. However, in some embodiments, the lens 116 can include a support structure 308 that is positioned between the edges of the lens 116 and the walls of the connector body 104 and/or the receiving collar 204. The support structure 308 can be or include a rigid or semi-rigid structure that support the lens 116. In various embodiments, the support structure 308 can be a ring that holds the lens 116. The lens 116 can be any suitable diameter, however, in various embodiments, the lens 116 has a diameter less than 300 microns.

In various embodiments, the fiber optic connector 100 can include index matching material 310. The index matching material 310 can be or include a substance that has an index of refraction that is the same as or similar to the index of refraction of the fiber optic strand 202 and/or the lens 116. The index matching material 310 can be positioned between the fiber optic strand 202 and the hollow core fiber 102 (e.g., between fiber optic strand 202 and the lens 116 and/or between the lens 116 and the hollow core fiber 102). The index matching material 310 can be or include liquid, cement, gel, glass, plastic, and/or any suitable material with an index of refraction that is similar to the index of refraction of the fiber optic strand 202 and/or the lens 116.

Figure 4:
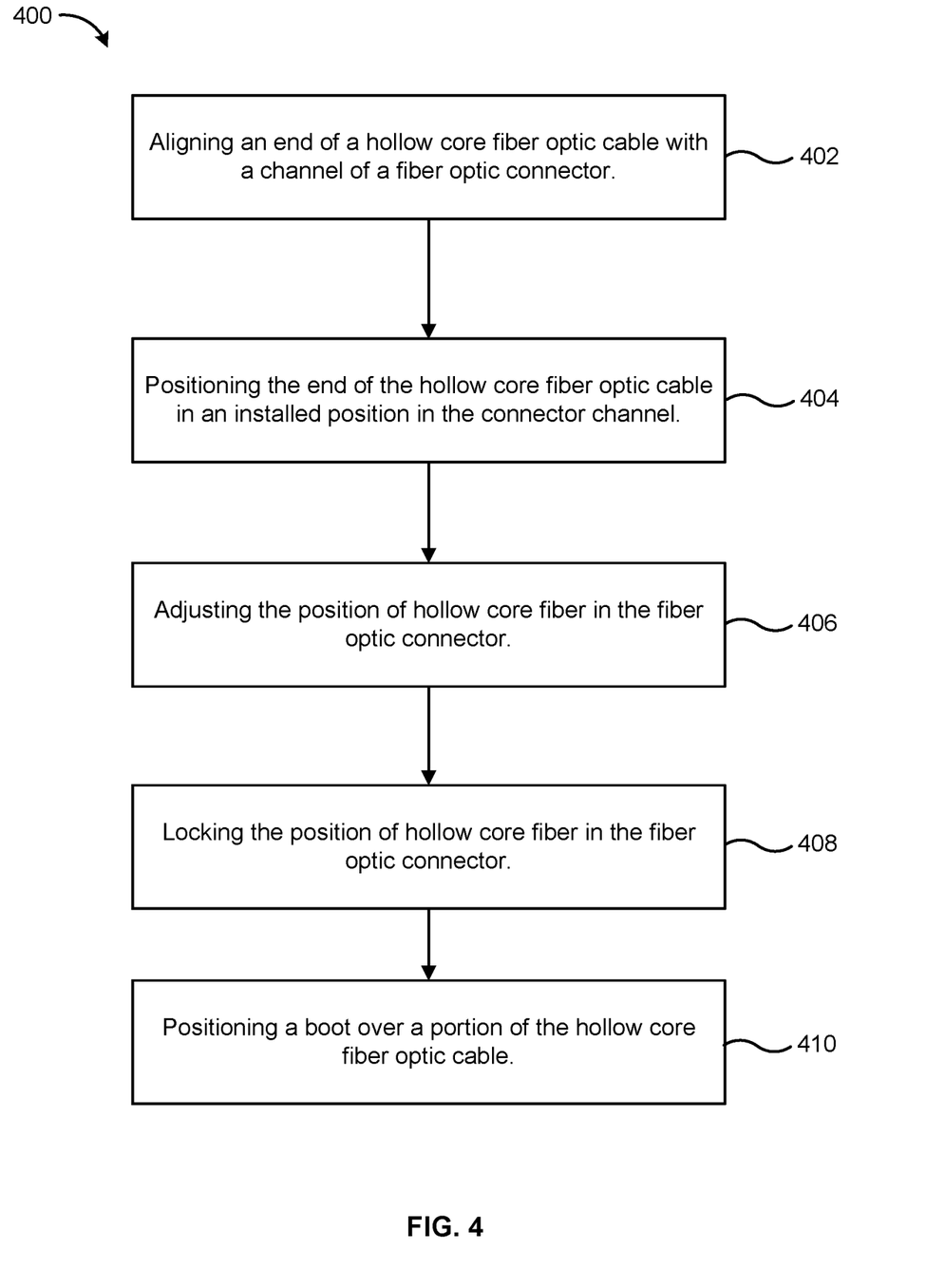
FIG. 4 is a flowchart illustrating a process for installing a hollow core fiber optic cable into the fiber optic connector of FIG. 1, according to various embodiments.

Turning to FIG. 4, a flowchart illustrating a process 400 for installing a hollow core fiber 102 into the fiber optic connector 100 of FIG. 1 is shown. Various blocks of the process 400 are described by referencing the components shown in FIG. 5 through 7, however, additional or alternative components may be used with the process 400.

Figure 5:
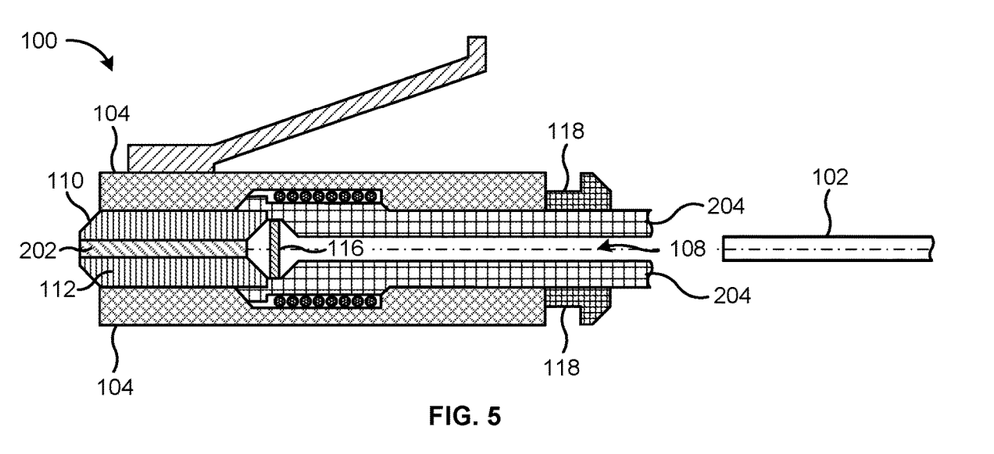
FIGS. 5 through 7 illustrate various states of components that may be implemented in a simplified example process for installing a hollow core fiber optic cable into the fiber optic connector of FIG. 1, according to various embodiments.

The process 400 at block 402 can include aligning an end of a hollow core fiber optic cable (e.g., hollow core fiber 102) with a channel (e.g., channel 108) of a fiber optic connector (e.g., fiber optic connector 100). As shown in FIG. 5, the hollow core fiber 102 can be aligned with the channel 108 to allow for installing the hollow core fiber 102 into the channel 108. For example, the hollow core fiber 102 can be aligned with the channel 108 for insertion of the hollow core fiber 102 into the channel 108. The hollow core fiber 102 can be aligned with the channel 108 without the use of specialized tools or equipment. For example, a technician can receive the hollow core fiber 102 and the fiber optic connector 100 and align the hollow core fiber 102 with the channel 108.

Figure 6:
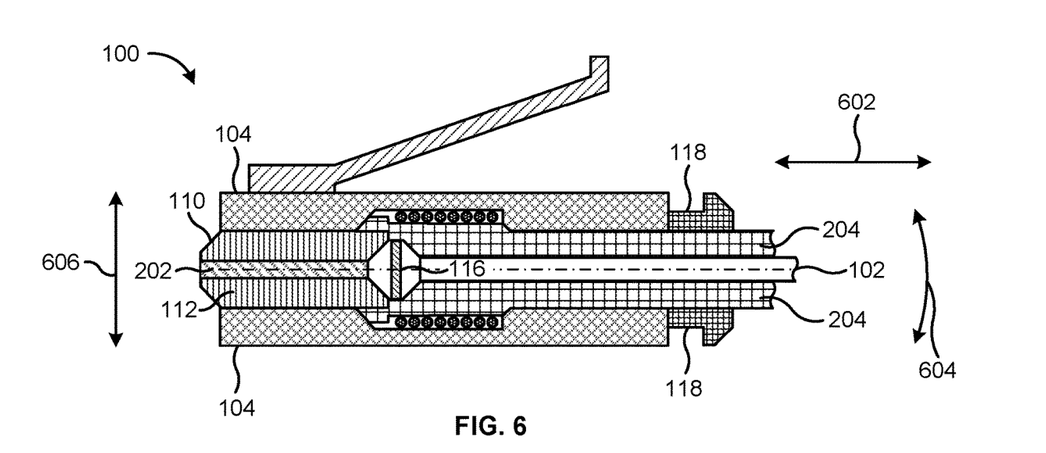

The process 400 at block 404 can include positioning the end of the hollow core fiber 102 in an installed position in the channel 108. As shown in FIG. 6, the hollow core fiber 102 can be installed in the channel 108 with the end of the hollow core fiber 102 positioned adjacent to the lens 116. The hollow core fiber 102 can additionally or alternatively be positioned in the channel 108 such that the end of the hollow core fiber 102 is aligned with the end of the fiber optic strand 202 in the ferrule 110. The hollow core fiber 102 being installed in the channel 108 can allow a signal (e.g., light) to travel from the hollow core fiber 102 to the fiber optic strand 202. The end of the hollow core fiber 102 can be positioned adjacent to the lens 116. For example, the lens 116 can be positioned between the fiber optic strand 202 and the hollow core fiber 102. The signal (e.g., light) exiting from the end of the hollow core fiber 102 can be directed by the lens 116 to the fiber optic strand 202. For example, the lens 116 can focus the light from the hollow core fiber 102 to the end of the fiber optic strand 202. In various embodiments, index matching material 310 can be positioned between the hollow core fiber 102 and the fiber optic strand 202 to aid in the focusing of the light. For example, the index matching material 310 can be positioned between the fiber optic strand 202 and the lens 116 and/or between the lens 116 and the hollow core fiber 102.

The process 400 at block 406 can include adjusting the position of the hollow core fiber 102 in the fiber optic connector 100. The adjustment device 118 can be used to move the end of the hollow core fiber 102 relative to the lens 116. The adjustment device 118 can move the hollow core fiber 102 along a horizontal direction (e.g., along axis 602 in FIG. 6). In various embodiments, the adjustment device 118 can move the hollow core fiber 102 relative to the connector body 104 and/or the receiving collar 204. However, the adjustment device 118 can additionally or alternatively move the receiving collar 204 with the hollow core fiber 102 installed to move the end of the hollow core fiber 102 relative to the lens 116. In some embodiments, the adjustment device 118 can similarly move along axis 602 (e.g., while moving the hollow core fiber 102). In further embodiments, the adjustment device 118 can rotate (e.g., as shown by rotation arrow 604 of FIG. 6). Rotation of the adjustment device 118 can cause the hollow core fiber 102 to move (e.g., along axis 602. The adjustment device 118 can move the end of the hollow core fiber 102 in micron increments. However, the adjustment device 118 can move the end of the hollow core fiber 102 in smaller and/or larger increments.

In various embodiments, adjusting the position of the hollow core fiber 102 can include using standard installation equipment to aid in the positioning of the hollow core fiber 102. For example, a power meter and/or standard installation equipment can be used to position the end of the hollow core fiber 102 relative to the lens 116. The position of the hollow core fiber 102 can be based on a reduction of loss of the signal measured by the power meter. The position of the hollow core fiber 102 can be locked when the loss has reached a predetermined threshold. The use of standard installation equipment can allow a technician to precisely position the end of the hollow core fiber 102 in the channel 108 without using specialized techniques and/or equipment.

The process 400 at block 408 can include locking the position of the hollow core fiber 102 in the fiber optic connector 100. The position of the hollow core fiber 102 can be locked using the adjustment device 118 and/or the locking mechanism. The hollow core fiber 102 can be locked in position such that the end of the hollow core fiber 102 remains in the same position relative to the lens 116.

Figure 7:
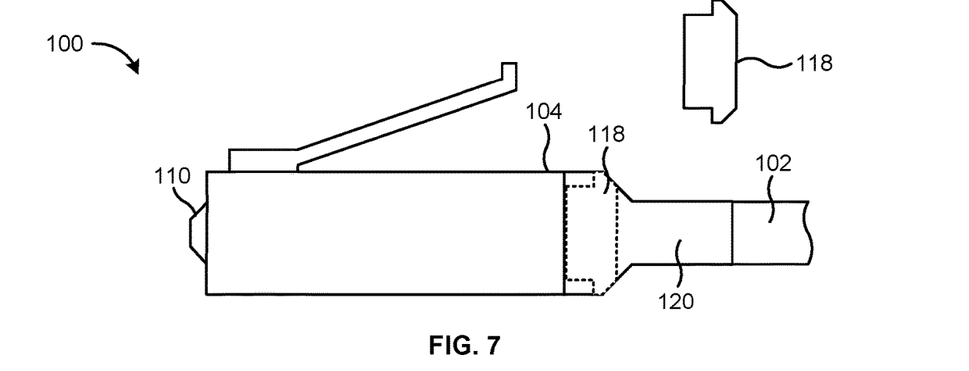

The process 400 at block 410 can include positioning a boot (e.g., boot 120) over a portion of the hollow core fiber 102. For example, the boot 120 can be positioned over the hollow core fiber 102 to provide strain relief to the hollow core fiber 102. As shown in FIG. 7, the boot 120 can be positioned over the adjustment device 118 (e.g., as shown in dotted lines). However, the adjustment device 118 can be removed prior to the positioning of the boot 120 over the hollow core fiber 102 (e.g., as shown in solid lines).

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A fiber optic connector system, comprising:
    a connector body defining a connector channel;
    a ferrule positioned in a first end of the connector channel, the ferrule comprising a ferrule body defining a passage therethrough and an optical fiber strand positioned within the passage, wherein the optical fiber strand terminates at a distal end and a proximal end each within the ferrule body;
    a hollow core fiber positioned in a second end of the connector channel;
    a lens positioned within the connector channel and disposed between the ferrule and the hollow core fiber, the lens configured to direct light emitted from the hollow core fiber to the optical fiber strand of the ferrule; and
    an adjustment device coupled with the connector body, the adjustment device configured to move an end of the hollow core fiber toward or away from the lens along a longitudinal axis of the connector channel in response to rotation of the adjustment device about the longitudinal axis.

2. The fiber optic connector system of claim 1, further comprising index matching material positioned between the hollow core fiber and the ferrule when the ferrule is positioned within the connector channel.

3. The fiber optic connector system of claim 1, wherein the adjustment device is further configured to lock the hollow core fiber in a fixed position.

4. The fiber optic connector system of claim 3, wherein at least a portion of the adjustment device is removeable from the connector body after locking the hollow core fiber in the fixed position.

5. The fiber optic connector system of claim 1, further comprising a boot formed comprising a rigid or semi-rigid material that at least partially surrounds the hollow core fiber, the boot configured to reduce bending of the hollow core fiber extending from the connector body.

6. The fiber optic connector system of claim 1, wherein the optical fiber strand of the ferrule comprises a single-mode optical fiber (SMF) strand or a multi-mode optical fiber (MMF) strand.

7. A method of connecting fiber optic cables, the method comprising:
    aligning an end of a hollow core fiber optic cable with a connector channel defined by a body of a fiber optic connector;
    positioning the end of the hollow core fiber optic cable in an installed position in the connector channel, wherein in the installed position the end of the hollow core fiber optic cable is aligned with:
        a lens positioned within the connector channel; and
        an end of a ferrule, wherein the ferrule has a ferrule body containing a fiber optic strand, wherein the fiber optic strand terminates at a distal end and a proximal end each within the ferrule body, and wherein the ferrule is positioned at least partially within the connector channel such that the lens directs light emitted from the end of the hollow core fiber optic cable to the end of the ferrule; and
    moving the end of the hollow core fiber optic cable relative to the lens using an adjustment device to move the end of the hollow core fiber optic cable toward or away from the lens along a longitudinal axis of the connector channel.

8. The method of claim 7, wherein movement of the end of the hollow core fiber optic cable along the longitudinal axis is based on measurements from a power meter.

9. The method of claim 7, further comprising fixing the hollow core fiber optic cable in the installed position in the connector channel.

10. The method of claim 9, wherein fixing the hollow core fiber optic cable in the installed position in the connector channel comprises locking a position of the hollow core fiber optic cable with an adjustment device.

11. The method of claim 7, further comprising moving the end of the hollow core fiber optic cable and the lens relative to the end of the ferrule.

12. A fiber optic connector, comprising:
    a connector body defining a connector channel, the connector channel having a first end in which is received a ferrule having a ferrule body containing a fiber optic strand that terminates at a distal end and a proximal end each within the ferrule body, the connector channel configured to receive a hollow core fiber in a second end of the connector channel;
    a lens positioned within the connector channel such that the lens is disposed between the ferrule and the hollow core fiber when the ferrule and the hollow core fiber are positioned in the connector channel, the lens configured to direct light emitted from the hollow core fiber to an optical fiber positioned within the ferrule; and
    an adjustment device coupled with the connector body, the adjustment device configured to move an end of the hollow core fiber relative to the lens.

13. The fiber optic connector of claim 12, wherein at least a portion of the adjustment device is detachable from the connector body.

14. The fiber optic connector of claim 12, wherein the adjustment device is further configured to lock and prevent movement of the end of the hollow core fiber relative to the lens.

15. The fiber optic connector of claim 12, further comprising index matching material positioned between the hollow core fiber and the ferrule when the ferrule and the hollow core fiber are positioned within the connector channel.

16. The fiber optic connector of claim 12, wherein the lens is positioned in a support structure configured to align a center of the lens with a center of the optical fiber.

17. The fiber optic connector of claim 12, further comprising a boot comprising a rigid or semi-rigid material that at least partially surrounds the hollow core fiber and reduces bending of the hollow core fiber extending from the connector body.

* * * * *